United States Patent [19]
Lee et al.

[11] Patent Number: 5,416,518
[45] Date of Patent: May 16, 1995

[54] CAMERA AUTO FOCUS SYSTEM

[75] Inventors: Chuen-Chien Lee, Fremont; Teruyoshi Komuro, Santa Clara, both of Calif.; Naoki Kawaguchi; Reiko Torii, both of Tokyo, Japan

[73] Assignee: Sony Electronics, Inc., Park Ridge, N.J.

[21] Appl. No.: 937,053

[22] Filed: Aug. 27, 1992

[51] Int. Cl.⁶ ............................................. H04N 5/232
[52] U.S. Cl. ..................................................... 348/349
[58] Field of Search ...................... 358/227, 228, 209; 354/400, 402; H04N 5/232, 5/238; 348/345, 349, 350, 351, 352, 356, 362

[56] References Cited
U.S. PATENT DOCUMENTS 5,115,262  5/1992  Komiya ................................ 354/402

FOREIGN PATENT DOCUMENTS 3-125575   5/1991  Japan .
3-243071  10/1991  Japan .

*Primary Examiner*—Michael T. Razavi
*Assistant Examiner*—Tuan V. Ho
*Attorney, Agent, or Firm*—Irell & Manella

[57] ABSTRACT

A method an apparatus for automatically focusing cameras. An auto focus circuit detects highly bright objects contained within an image frame of a scene. If highly bright objects are not detected, an auto focus processor adjusts the focus of the camera to maximize high spatial frequency components of the image frame. The auto focus processor focuses on the highly bright objects by minimizing a count function that indicates the number of pixels having greater magnitude than a threshold reference.

5 Claims, 14 Drawing Sheets

CAMERA AUTO FOCUS SYSTEM

BACKGROUND OF THE INVENTION

1. Field of the Invention

This invention relates to the field of camera systems. More particularly, this invention relates to methods and apparatus for automatically focusing cameras.

2. Art Background

A typical auto focus system for a camera achieves focus by adjusting an optical lens system to maximize high frequency components of a signal representing the image scene. Such systems maximize the high frequency components because a focused image contains more spatial high frequency components than a blurred image.

For example in a typical video camera auto focus system, a charge coupled device (CCD) image array senses an image rendered by an optical lens system. A camera signal processor receives color signals from the CCD array, and generates a luminance signal. The luminance signal is filtered by one or more band pass filters, which extract the high frequency components of the luminance signal. The filtered luminance signal from the band pass filter is coupled to a detector circuit which generates an evaluation function. The evaluation function is a measure of the high frequency components of the filtered luminance signal.

An auto focus processor maximizes the high frequency components of the luminance signal by adjusting the focus position of the optical lens system until the evaluation function is at the maximum. The auto focus processor adjusts the focus position by actuating a motor coupled to the optical lens system.

However, an auto focus method that maximizes the high frequency components of the luminance signal fails to focus on highly bright objects. Highly bright objects are objects within the image scene that saturate the CCD array. As the auto focus processor adjusts the optical lens system to maximize the evaluation function, a blurred image of the highly bright object saturates the CCD array. Saturation of the CCD array causes the band pass filters to generate a constant output as the auto focus processor adjusts the optical lens system. The constant output of the band pass filter renders the evaluation function useless for maximizing the high frequency components of the luminance signal.

Moreover, the blurred image of the highly bright object reduces in size as the auto focus processor adjusts the optical lens system toward focus. The reduction in size of the blurred image causes reduction of some types of evaluation functions. As a consequence, the auto focus method of maximizing the evaluation function actually moves the optical lens system away from the point of focus.

As will be described, the present invention is a method and apparatus for auto focusing a camera wherein the image scene may contain highly bright objects.

SUMMARY AND OBJECTS OF THE INVENTION

It is therefore an object of the present invention is to automatically adjust the focus of a camera.

It is an object of the present invention is to automatically adjust the focus of a camera, wherein the image scene contains highly bright objects that saturate the image detector.

It is an object of the present invention is to automatically adjust the focus of a video camera.

It is further an object of the present invention is to automatically adjust the focus of a video camera to focus on highly bright objects contained within the image scene.

It is an object of the present invention to automatically adjust the focus of a video camera by eliminating highly bright objects from the image scene and by focusing on remaining normal objects in the image scene.

These and other objects of the invention are provided by a method and apparatus for automatically focusing a camera. An auto focus circuit detects highly bright objects contained within an image frame of a scene. If highly bright objects are not detected, an auto focus processor adjusts the focus of the camera to maximize high spatial frequency components of the image frame. If highly bright objects are detected, the auto focus circuit masks the highly bright objects from the evaluation function.

The auto focus circuit then detects normal objects in the image frame. If normal objects are detected, the auto focus processor adjusts the focus of the camera while masking the highly bright objects from the image frame. If normal objects are not detected, the auto focus processor adjusts the focus of the camera while not masking the highly bright objects from the image frame. The auto focus processor focuses on the highly bright objects by minimizing a count function that indicates the number of pixels having greater magnitude than a threshold reference.

Other objects, features and advantages of the present invention will be apparent from the accompanying drawings, and from the detailed description that follows below.

DETAILED DESCRIPTION OF THE INVENTION

A method and apparatus is disclosed for automatically focusing cameras wherein the image scene may contain highly bright objects. In the following description, for purposes of explanation, specific circuit devices, circuit architecture's and components are set forth in order to provide a more thorough understanding of the present invention. However, it will be apparent to one skilled in the art that the present invention may be practiced without these specific details. In other instances, well known circuits and devices are shown in schematic form in order not to obscure the present invention unnecessarily.

Figure 1:
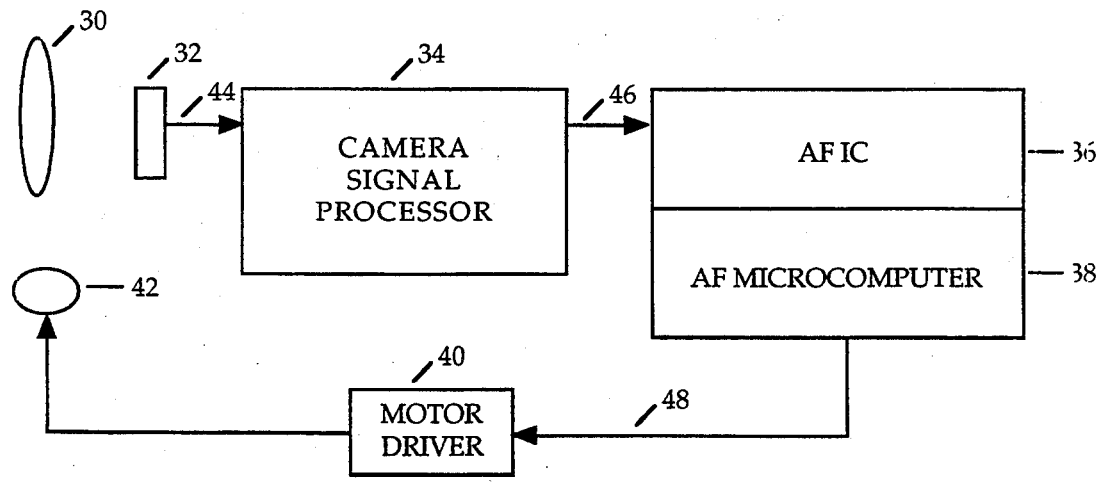
FIG. 1 is a block diagram of a video camera auto focusing system, including an optical lens system, a CCD array, a camera signal processor, an auto focus circuit, an auto focus processor, a motor driver circuit, and a motor.

Referring now to FIG. 1, a block diagram of the present video camera auto focusing system is shown. An optical lens system 30 samples light rays from an image scene, and transfers the light rays to a charge coupled device (CCD) array 32. The CCD array 32 senses the color and intensity of the light rays and generates a video color signal 44, which represents the image scene. A camera signal processor 34 is coupled to receive the video color signal 44 from the CCD array 32. The camera signal processor 34 generates a luminance signal 46 corresponding to the color signal 44.

An auto focus integrated circuit (AF IC) 36 is coupled to receive the luminance signal 46 from the camera signal processor 34. The AF IC 36 also receives reference signals and control signals from an auto focus microcomputer (AF microcomputer) 38. The AF IC 36 generates evaluation functions, and transfers the evaluation functions to the AF microcomputer 38.

The AF microcomputer 38 generates control signals 48, and transmits the control signals 48 to a motor driver circuit 40. The motor driver circuit 40 actuates a motor 42. The AF microcomputer 38 generates the control signals 48 to adjust the focus position of the optical lens system 30.

Figure 2:
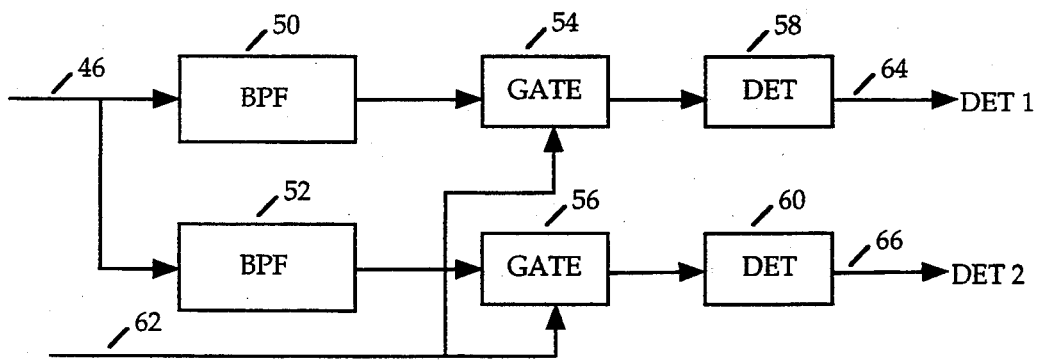
FIG. 2 is a block diagram of a circuit for generating evaluation functions that reflect the high frequency components of the luminance signal representing an image frame of the image scene.

FIG. 2 is a block diagram of a circuit for generating evaluation functions that reflect the high frequency components of the luminance signal 46. The circuit illustrated is contained within the AF IC 36. For one embodiment, a pair of band pass filters (BPF) 50 and (BPF) 52 are coupled to receive the luminance signal 46 from the camera signal processor 34. The BPF 50 and the BPF 52 extract the high frequency components of the luminance signal 46. The BPF 50 and the BPF 52 extract the high frequency components in different frequency bands.

The BPF 50 and the BPF 52 are employed to extract high frequency components in two different frequency ranges because image scenes may differ in the frequency range of spatial frequency components. In fact, for other embodiments, more than two band pass filters are employed to extract high frequency components.

A gate circuit 54 is coupled to receive the output of the BPF 50. The gate circuit 54 is also coupled to receive a window control signal 62 from the AF microcomputer 38. The window control signal 62 determines an evaluation window. The evaluation window is a portion of the image scene that is sampled to generate the evaluation functions. The window control signal 62 causes the gate circuit 54 to block the output of the BPF 50. The AF microcomputer 38 generates the window control signal 62 to block the portion of the luminance signal 46 corresponding to an area of the image scene outside of the evaluation window.

A detector circuit (DET) 58 is coupled to receive the output of the gate circuit 54. The DET 58 generates an evaluation function 64, which is coupled for transfer to the AF microcomputer 38. The evaluation function 64 reflects the high frequency component of the luminance signal 46 extracted by the BPF 50.

For one embodiment, the DET 58 generates an $H_{peak}$ function for the evaluation function 64. To generate the $H_{peak}$ function, the DET 58 determines a peak value for each horizontal scan line of the image scene contained within the evaluation window, and sums the peak values for each horizontal scan line.

In a similar manner, a gate circuit 56 is coupled to receive the output of the BPF 52, and the window control signal 62 from the AF microcomputer 38. The gate circuit 56 blocks the output of the BPF 52 for portions of the luminance signal 46 that correspond to areas of the image scene outside the evaluation window. A detector circuit (DET) 60 is coupled to receive the output of the gate circuit 56. The DET 60 generates an evaluation function 66, which reflects the high frequency components of the luminance signal 46 passed by the BPF 52. In the current embodiment, the DET 60 generates an $H_{peak}$ function for the evaluation function 66.

Figure 3:
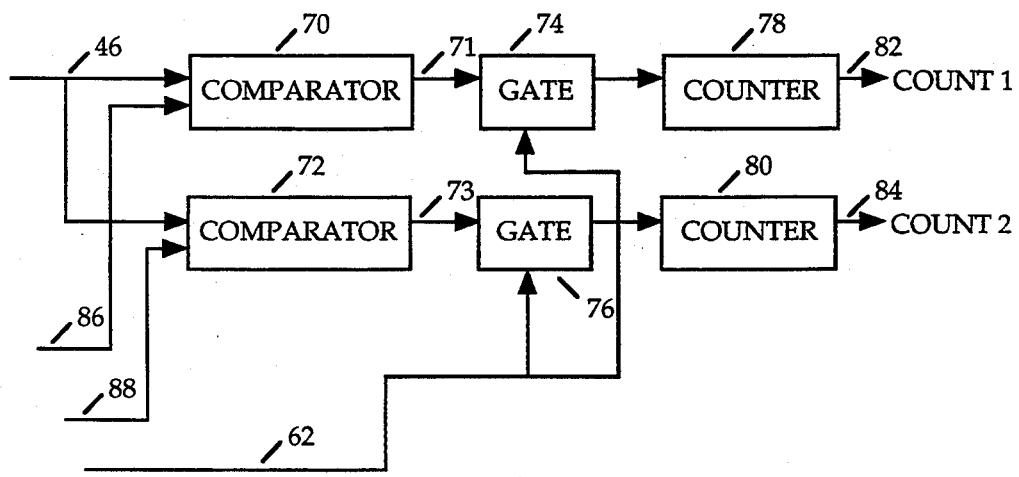
FIG. 3 is a block diagram of a circuit for detecting highly bright objects positioned within a evaluation window of the image scene.

FIG. 3 is a block diagram of a circuit for detecting highly bright objects positioned within the evaluation window of the image scene. The circuit illustrated is contained within the AF IC 36. A comparator circuit 70 is coupled to receive the luminance signal 46 from the camera signal processor 34. The comparator circuit 70 also receives the reference signal 86 from the AF microcomputer 38. The comparator circuit 70 compares the luminance signal 46 with a reference signal 86. The comparator circuit 70 generates a pulse signal 71 if the magnitude of the luminance signal 46 is greater than the magnitude of the reference signal 86.

A gate circuit 74 is coupled to receive the pulse signal 71 from the comparator circuit 70. The gate circuit 74 is also coupled to receive the window control signal 62 from the AF microcomputer 38. The gate circuit 74 blocks the pulse signal 71 for areas of the image scene outside the evaluation window. A counter circuit 78 receives the pulse signal 71. The counter circuit 78 generates a count signal 82, which is transmitted to the AF microcomputer 38. The count signal 82 indicates the number of pixels within the evaluation window having a magnitude of the luminance signal 46 greater than the reference signal 86.

Similarly, a comparator circuit 72 is coupled to receive the luminance signal 46 from the camera signal processor 34, and a reference signal 88 from the AF microcomputer 38. The comparator circuit 72 compares the luminance signal 46 with the reference signal 88. The comparator circuit 72 generates a pulse signal 73 if the luminance signal 46 has a greater magnitude than the reference signal 88. A gate circuit 76 is coupled to receive the pulse signals 73 from the comparator 72, and the window control signal 62 from the AF microcomputer 38. The gate circuit 76 blocks the pulse signal 73 for areas of the image scene outside the evaluation window. A counter circuit 80 generates a count signal 84, which is transmitted to the AF microcomputer 38. The count signal 84 indicates the number of pixels within the evaluation window having a magnitude of the luminance signal 46 greater than the reference signal 88.

Figure 4:
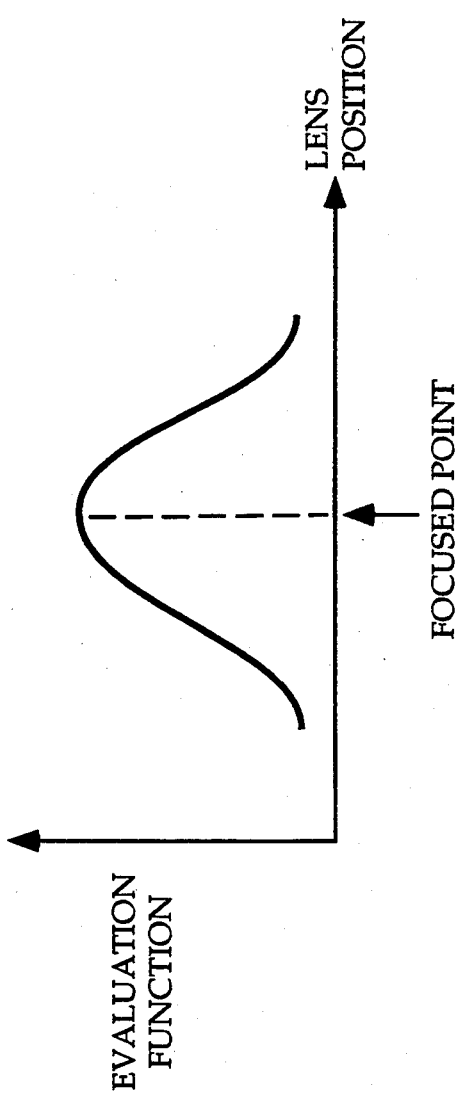
FIG. 4 is a graph illustrating example evaluation functions for an image scene not containing highly bright objects. The vertical axis of the graph indicates the magnitude of the evaluation function, while the horizontal axis of the graph indicates the focus position of the optical lens system.

FIG. 4 is a graph illustrating an example of the evaluation functions 64 and 66 for an image scene not containing highly bright objects. The vertical axis of the graph indicates the magnitude of the evaluation function 64 or 66. The horizontal axis of the graph indicates the focus position of the optical lens system 30. If highly bright objects are not present within the evaluation window, the maximum point of the evaluation function is the position of sharpest focus. The maximum point of the evaluation function indicates the position of the lens system 30 having the maximum high frequency components in the luminance signal 46.

Figure 5:
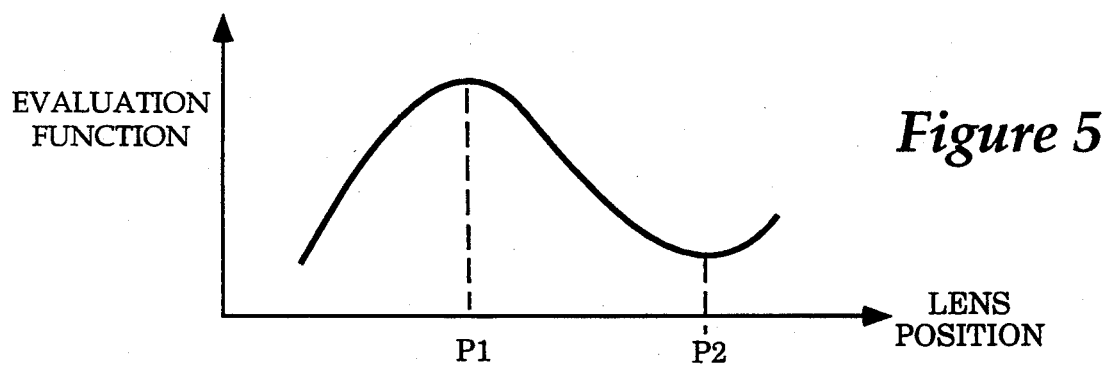
FIG. 5 is a graph illustrating example of the evaluation functions for an image scene containing a highly bright object. The vertical axis of the graph indicates the magnitude of the evaluation function, while the horizontal axis of the graph indicates the focus position of the optical lens system.

FIG. 5 is a graph illustrating an example of the evaluation functions 64 and 66 for an image scene containing a highly bright object. The vertical axis of the graph indicates the magnitude of the evaluation function 64 or 66, while the horizontal axis of the graph indicates the focus position of the optical lens system 30.

The blurred image of the highly bright object in the image scene saturates the CCD array 32 at position P1 of the optical lens system 30. The true focus position for the highly bright object is position P2. The highly bright object gets smaller as it is brought into focus, which yields a smaller $H_{peak}$ evaluation function.

Figure 6:
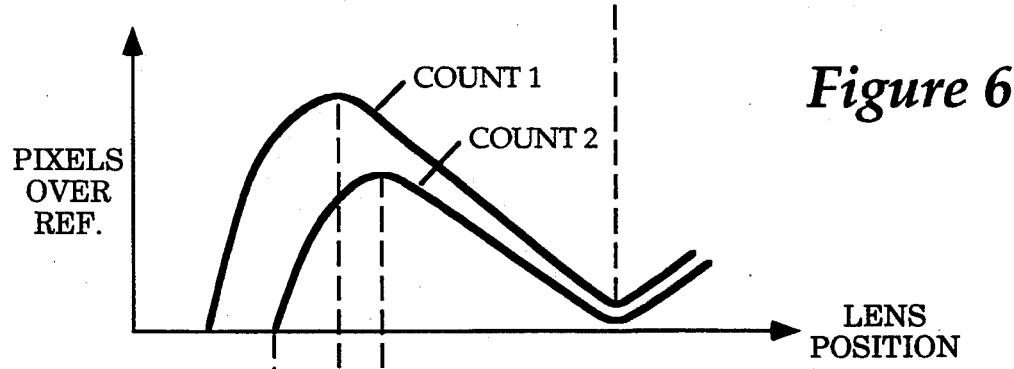
FIG. 6 is a graph illustrating examples of the count signals COUNT1 and COUNT2 for an image scene containing the highly bright object. The vertical axis of the graph is a pixel count, while the horizontal axis of the graph indicates the focus position of the optical lens system.

FIG. 6 is a graph illustrating examples of the count signal 82 (COUNT1) and the count signal 84 (COUNT2) for an image scene containing the highly bright object. The vertical axis of the graph is a pixel count, which indicates the number of pixels of the luminance signal 46 having a greater magnitude than the reference signals 86 and 88 (PIXELS OVER REF.). The horizontal axis of the graph indicates the focus position of the optical lens system 30. For one embodiment, the AF microcomputer 38 sets the reference signals 86 and 88 to values greater than one-third of the dynamic range of the CCD array 32 in order to sense highly bright objects in the image scene.

Figure 7:
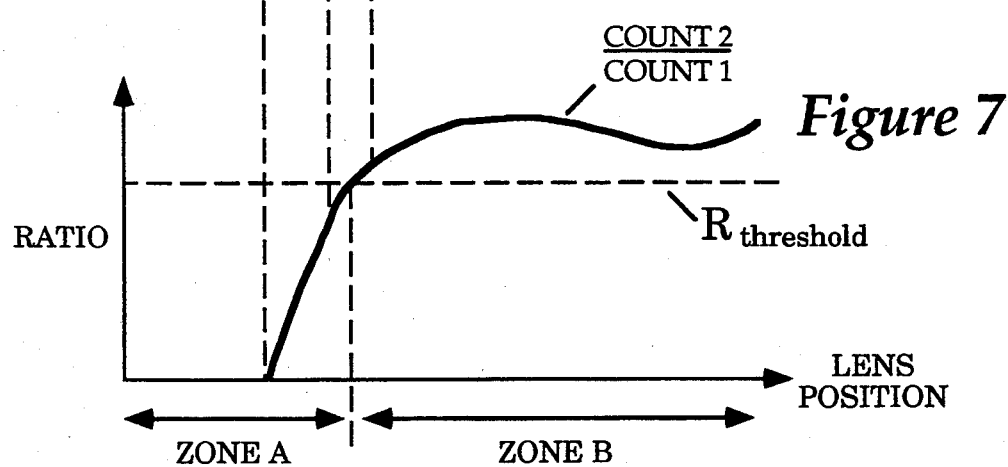
FIG. 7 is a graph illustrating the ratio of COUNT2/COUNT1. The vertical axis of the graph indicates the ratio, while the horizontal axis of the graph indicates the focus position of the optical lens system.

FIG. 7 is a graph illustrating the ratio of the count signal 84 divided by the count signal 82 (COUNT2/COUNT1). The vertical axis of the graph indicates the ratio, while the horizontal axis of the graph indicates the focus position of the optical lens system 30. A threshold ratio ($R_{threshold}$) is chosen to intersect the COUNT2/COUNT1 curve between the peaks of the COUNT1 and COUNT2 curves of FIG. 6. The intersection of the COUNT2/COUNT1 curve and the $R_{threshold}$ divides the COUNT2/COUNT1 curve into Zone A and Zone B. The $R_{threshold}$ is selected such that the maximum point P1 of the evaluation function is included in Zone B.

In Zone A, the highly bright object has not saturated the CCD array 32, and the evaluation function is maximized as normal. When the focus position of the optical lens system 30 is within Zone A, the AF microcomputer 38 causes the motor 42 to move the optical lens system 30 to maximize the evaluation function 64 or 66.

In Zone B, the highly bright object has saturated the CCD array 32, and the evaluation function is not useful for finding the focus position for the highly bright object. When the focus position of the optical lens system 30 is within Zone B, the AF microcomputer 38 causes the motor 42 to move the optical lens system 30 to minimize the count signal 82.

Figure 8:
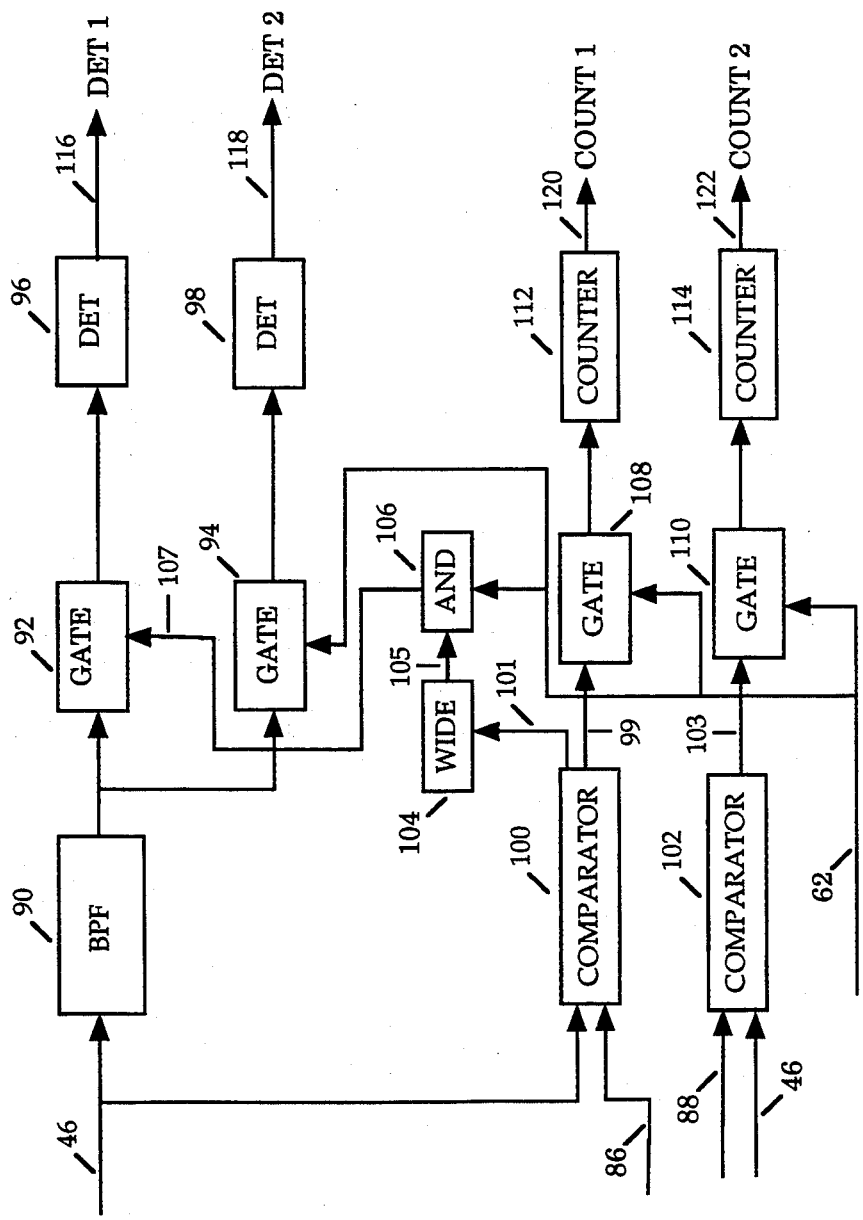
FIG. 8 is a block diagram of a circuit for eliminating highly bright objects from the evaluation function and for focusing on any remaining normal objects contained within the image scene.

FIG. 8 is a block diagram of a circuit for eliminating highly bright objects from the evaluation function and for focusing on any remaining normal objects contained within the image scene. The circuit illustrated is contained within the AF IC 36. For one embodiment, a band pass filter (BPF) 90 is coupled to receive the luminance signal 46 from the camera signal processor 34. The BPF 90 extracts the high frequency components of the luminance signal 46.

A gate circuit 92 is coupled to receive the output of the BPF 90. The gate circuit 92 is also coupled to receive a control signal 107 from an AND circuit 106. The control signal 107 causes the gate circuit 92 to block the output of the BPF 90 corresponding to a highly bright object.

A detector circuit (DET) 96 is coupled to receive the output of the gate circuit 92. The DET 96 generates an evaluation function 116. The evaluation function 116 reflects the high frequency component of the luminance signal 46 passed by the BPF 90 and the gate circuit 92. For one embodiment, the DET 96 generates an $H_{peak}$ function for the evaluation function 116.

Similarly, a gate circuit 94 is coupled to receive the output of the BPF 90, and the window control signal 62 from the AF microcomputer 38. The gate circuit 94 blocks the output of the BPF 90 corresponding to areas of the image scene outside the evaluation window. A detector circuit (DET) 98 is coupled to receive the output of the gate circuit 94. The DET 98 generates an evaluation function 118, which reflects the high frequency component of the luminance signal 46 passed by the BPF 90 and the gate circuit 94. For one embodiment, the DET 98 implements an $H_{peak}$ function for the evaluation function 118.

A comparator circuit 100 is coupled to receive the luminance signal 46 from the camera signal processor 34. The comparator circuit 100 also receives the reference signal 86 from the AF microcomputer 38. The comparator circuit 100 compares the luminance signal 46 with the reference signal 86. The comparator circuit 100 generates a pulse signal 99 if the luminance signal 46 has a greater magnitude than the reference signal 86.

A gate circuit 108 is coupled to receive the pulse signal 99 from the comparator circuit 100. The gate circuit 108 is also coupled to receive the window control signal 62 from the AF microcomputer 38. The gate circuit 108 blocks the pulse signal 99 for areas of the image scene outside the evaluation window. A counter circuit 112 receives the pulse signal 99 from the gate circuit 108. The counter circuit 112 generates a count signal 120, which is transmitted to the AF microcomputer 38. The count signal 120 indicates the number of pixels within the evaluation window having a magnitude of the luminance signal 46 greater than the reference signal 86.

Similarly, a comparator circuit 102 is coupled to receive the luminance signal 46 from the camera signal processor 34, and the reference signal 88 from the AF microcomputer 38. The comparator circuit 102 generates a pulse signal 103 if the luminance signal 46 has a greater magnitude than the reference signal 88. A gate circuit 110 is coupled to receive the pulse signal 103 from the comparator 102, and the window control signal 62 from the AF microcomputer 38. The gate circuit 110 blocks the pulse signal 103 for areas of the image scene outside the evaluation window. A counter circuit 114 generates a count signal 122, which indicates the number of pixels within the evaluation window having a magnitude of the luminance signal 46 greater than the reference signal 88.

A WIDE circuit 104 receives a pulse signal 101 from the comparator 100. The comparator circuit 100 generates the pulse signal 101 if the luminance signal 46 has a greater magnitude than the reference signal 86. The WIDE circuit 104 generates a wide pulse 105 by increasing the width of the pulse signal 101. The AND circuit 106 is coupled to receive the wide pulse 105. The AND circuit 106 is also coupled to receive the window control signal 62 from the AF microcomputer 38. The AND circuit 106 generates the control signal 107 for the gate circuit 92. The control signal 107 causes the gate circuit 92 to block the output of the BPF 90 for areas of the evaluation window containing highly bright objects.

FIGS. 9a–9d illustrate the functions of the WIDE circuit 104 and the AND circuit 106 to eliminate highly bright objects from the luminance signal 46. The AF microcomputer 38 sets the reference signal 86 to a saturation threshold value threshold. The comparator 100 generates the pulse signal 01 for portions of the luminance signal 46 that exceed $l_{threshold}$. The WIDE circuit 104 generates the wide pulse 105 by increasing the width of the pulse signal 101 by a time value DELTA T. The AND circuit 106 generates the control signal 107 as the logical product of the wide pulse 105 and the window control signal 62. The control signal 107 causes the gate circuit 92 to block the output of the BPF 90.

Figure 9A:
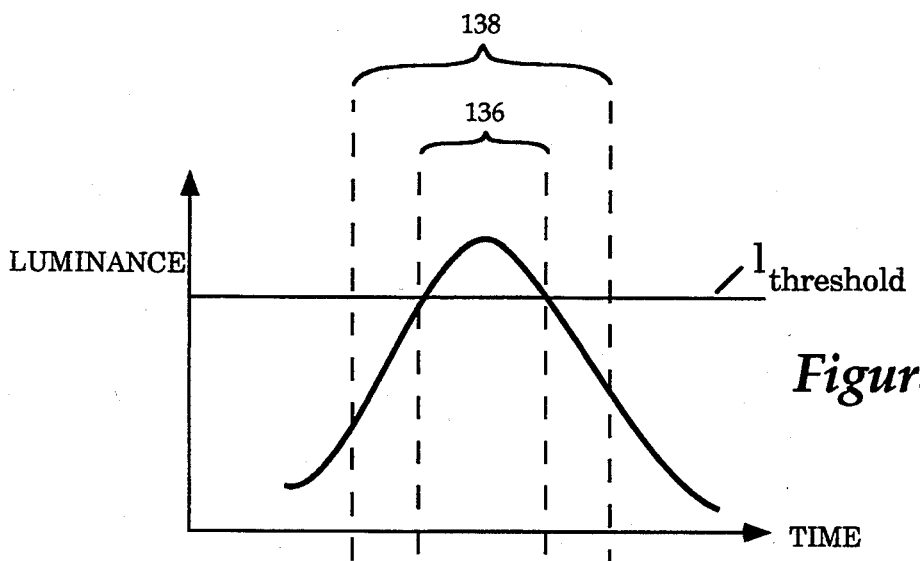
FIGS. 9a-9d illustrate the functions of the WIDE circuit and the AND circuit to eliminate highly bright objects from contribution to the evaluation function.
Figure 9B:
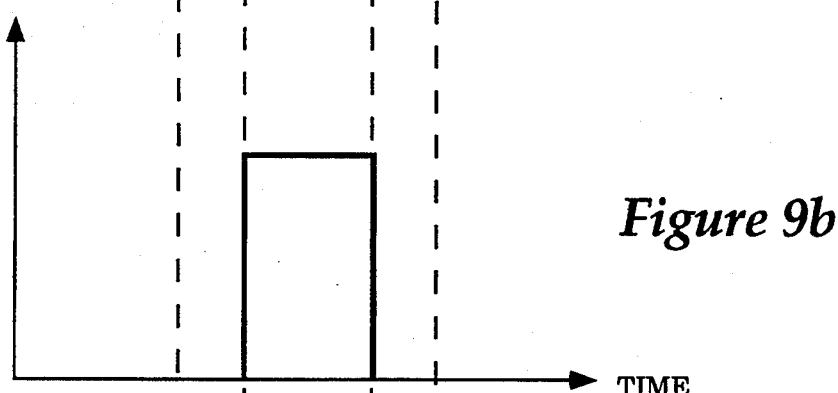
Figure 9C:
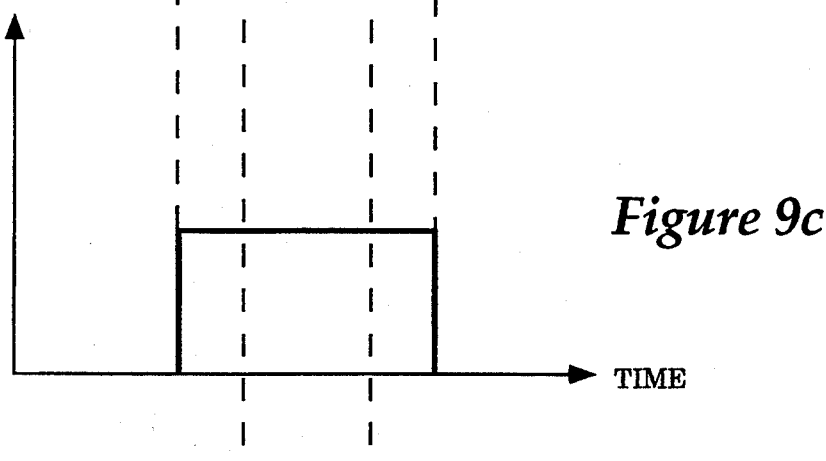
Figure 9D:
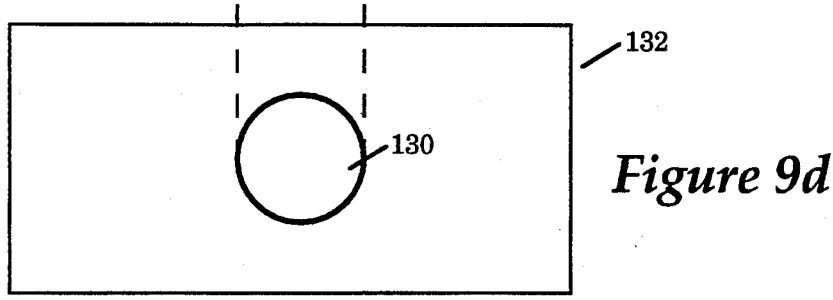

FIG. 9d illustrates an example highly bright object 130 positioned within an evaluation window 132. The highly bright object 130 is rendered on the CCD array 32 at a focus position of the optical lens system 30 that yields a blurred image.

FIG. 9a shows an example of the luminance signal 46 corresponding to a horizontal scan line of the evaluation window 132. As shown, the highly bright object 130 causes the luminance signal 46 to exceed $l_{threshold}$. FIG. 9b illustrates the pulse signal 101 generated by the comparator 100. The pulse signal 101 corresponds to a portion 136 of the luminance signal 46 that exceeds $l_{threshold}$.

FIG. 9c illustrates the wide pulse 105 generated by the WIDE circuit 104. The wide pulse 105 corresponds to a portion 138 of the luminance signal 46 extending on both sides of the luminance signal 46. The wide pulse 105 when merged with the window control signal 62 causes the gate circuit 92 to mask the portion 138 of the luminance signal 46 from contributing to the evaluation function 116. Thus, the DET 96 generates the evaluation function 116 without the contribution of the highly bright object 130.

Figure 10:
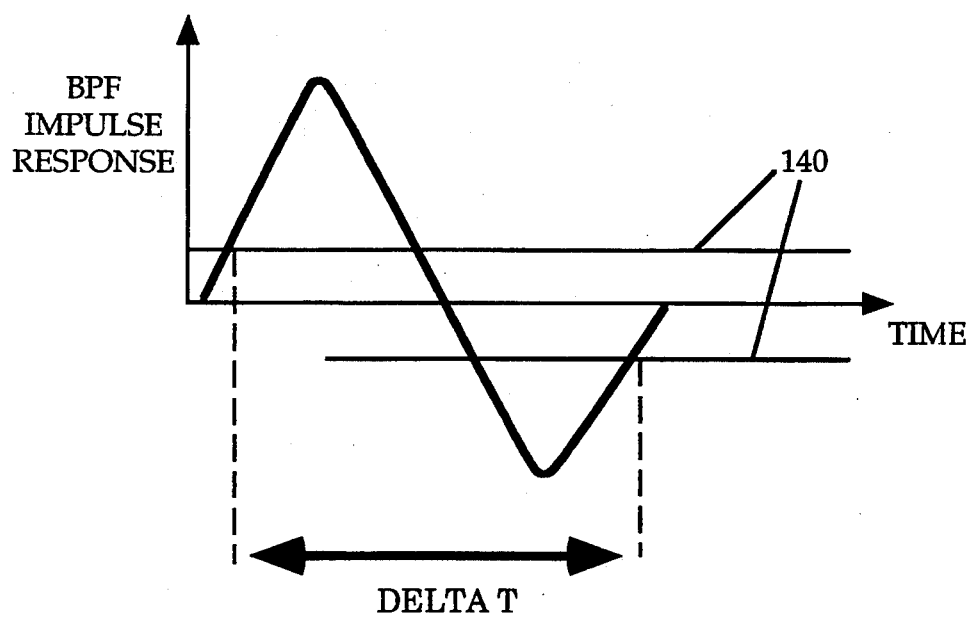
FIG. 10 illustrates a method for selecting the DELTA T for the WIDE circuit in order to eliminate highly bright objects from contribution to the evaluation function.

FIG. 10 illustrates a method for selecting the DELTA T for the WIDE circuit 104. A graph of the impulse response of the BPF 90 for one embodiment is shown. A pair of cutting lines 140 are placed at positions to intersect the impulse response at less than 20 percent of the absolute peak value. As shown on the graph, the intersection between the cutting lines 140 and the impulse response of the BPF 90 determine the DELTA T.

Figure 11:
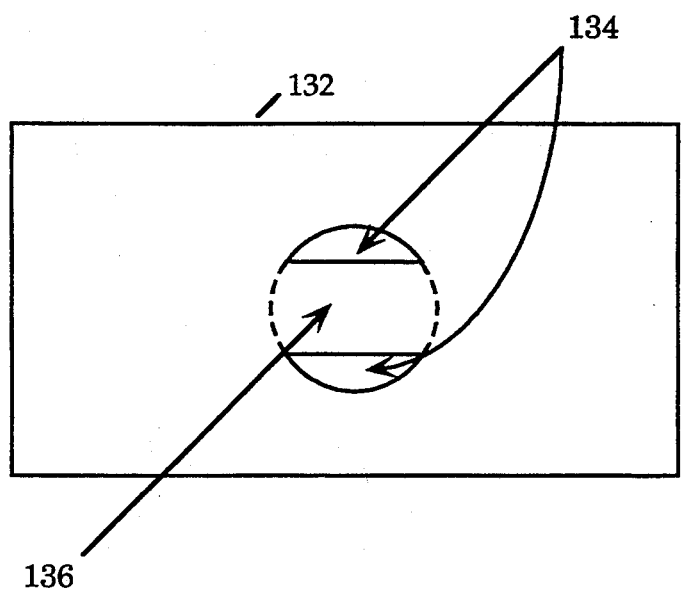
FIG. 11 illustrates an area of the highly bright object eliminated by the WIDE circuit and the AND circuit, and shows the remaining area of the highly bright object.

FIG. 11 illustrates an area 136 of the highly bright object 130 eliminated by the WIDE circuit 104 and the AND circuit 106. The area 136 is masked by the gate circuit 92. High frequency components of the luminance signal 46 corresponding to the area 136 do not contribute to the evaluation function 116. However, an area 134 of the highly bright object is not eliminated from the evaluation function 116. The effect of the area 134 on the evaluation function 116 depends on the method employed by the DET 96 to generate the evaluation function 116.

For example, if the DET 96 generates a summation of high frequency components of the luminance signal 46 over the entire evaluation window 132, then the area 134 does not significantly contribute to the evaluation function 116. However, if the DET 96 determines a peak value of high frequency components of the luminance signal 46 over the entire evaluation window 132, then the area 134 can dominate the evaluation signal 116. In the later case, the area 134 should be eliminated.

Figure 12A:
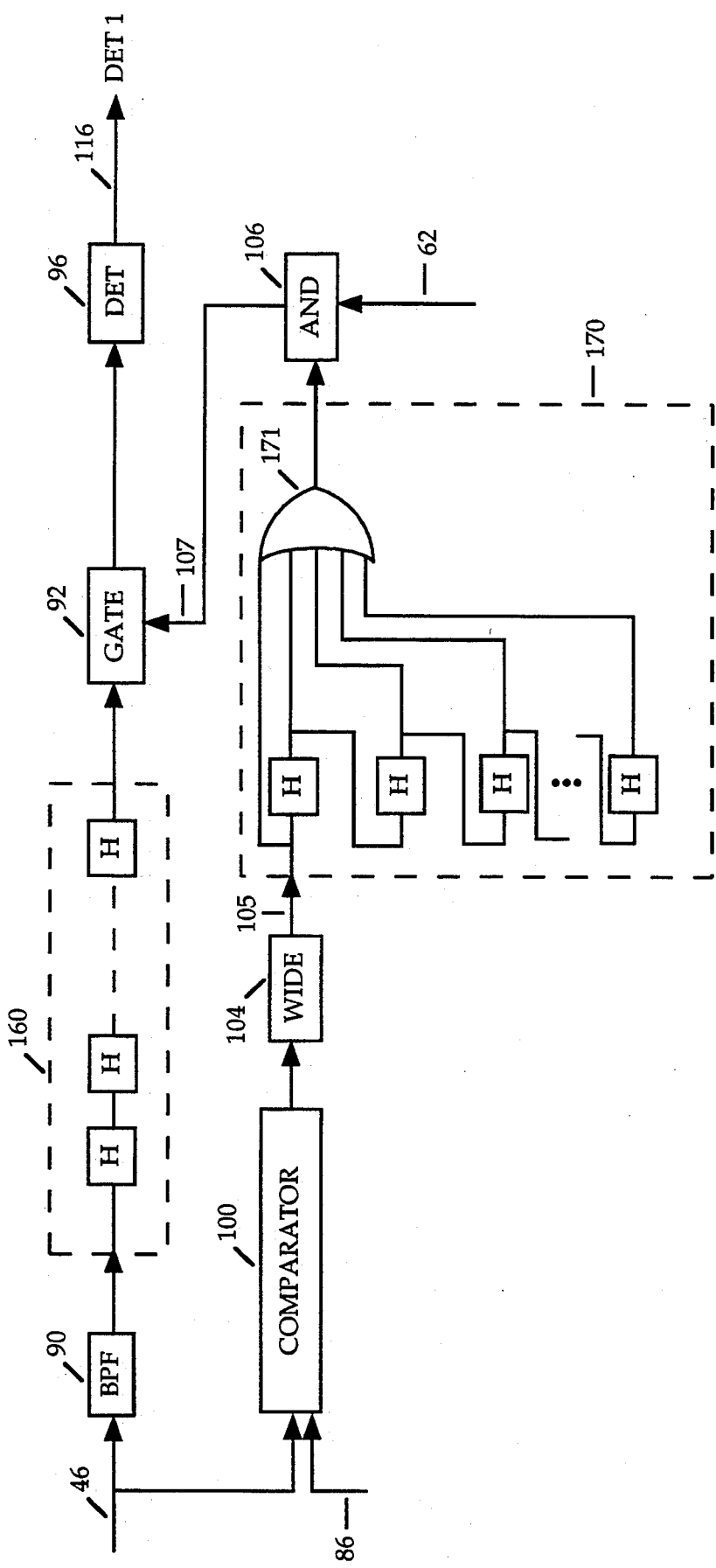
FIGS. 12a-12b illustrate a method and apparatus for eliminating the highly bright objects from the evaluation function, including areas not eliminated by the WIDE and AND circuits.
Figure 12B:
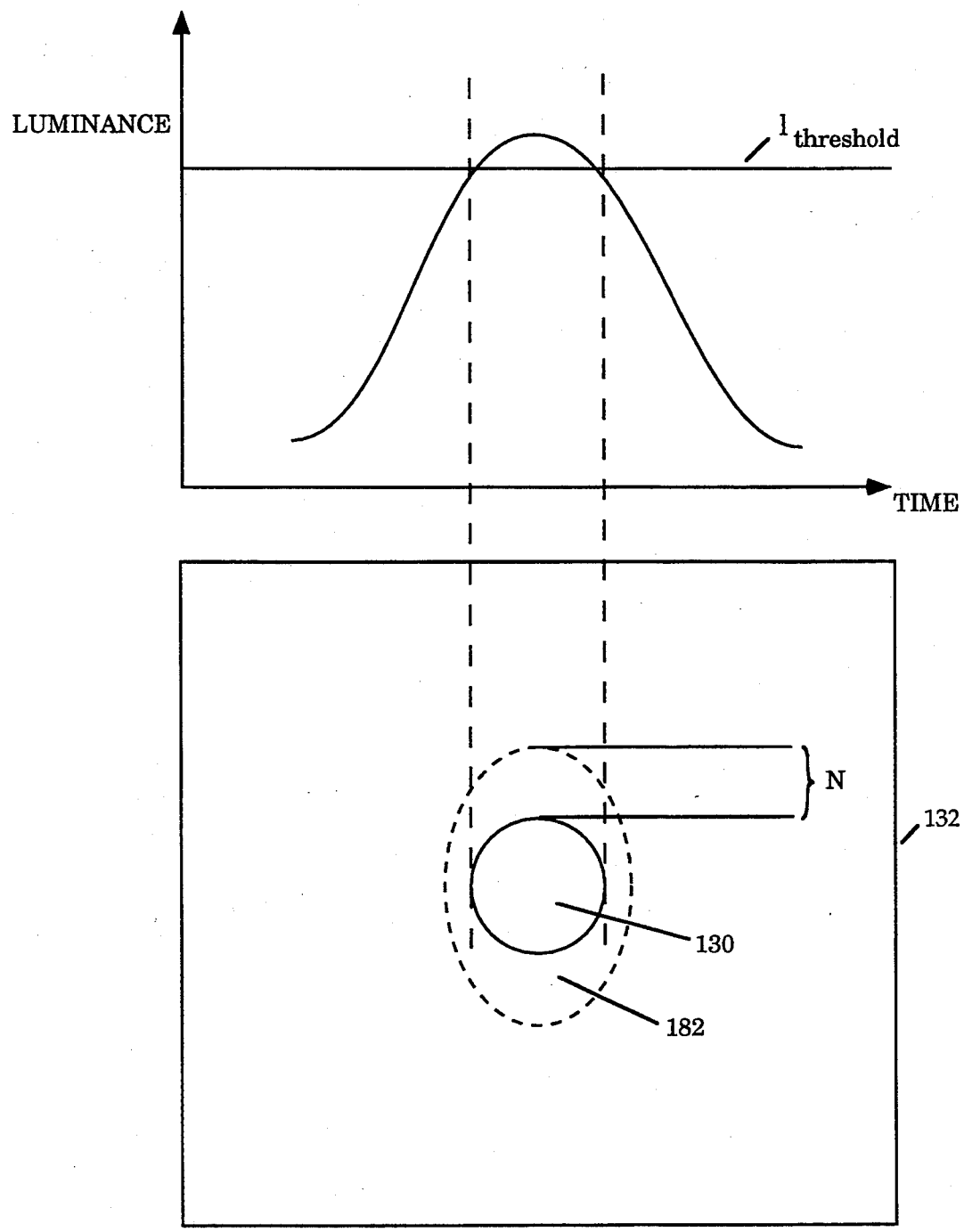

FIGS. 12a–12b illustrate a method and apparatus for eliminating the highly bright objects from the evaluation function for one embodiment. FIG. 12a is a block diagram of a circuit for eliminating the area 134 of the highly bright object 130 from the evaluation function 116. A delay circuit 160 is coupled to receive and delay the output of the BPF 90. The delay circuit 160 is comprised of a series of delay elements labeled "H". Each of the delay elements causes a delay equivalent to one horizontal scan line of the CCD array 32.

A delay wide circuit 170 is coupled to received the wide pulse 105 from the WIDE circuit 104. The delay wide circuit 170 is comprised of an OR gate 171 and a set of delay elements labeled "H". The inputs to the OR gate 171 are the wide pulse 105 and the outputs of the delay elements, which are successive delays of the wide pulse 105.

FIG. 12b shows the area 182 of the evaluation window 132 eliminated from the evaluation function 116. A vertical distance between the highly bright object 130 and the top of the eliminated area 182 comprises "N" horizontal scan lines. The number of horizontal scan lines N equals the number of delay elements H contained in the delay circuit 160. The number of delay elements H contained in the delay wide circuit 170 equals 2N.

Figure 13A:
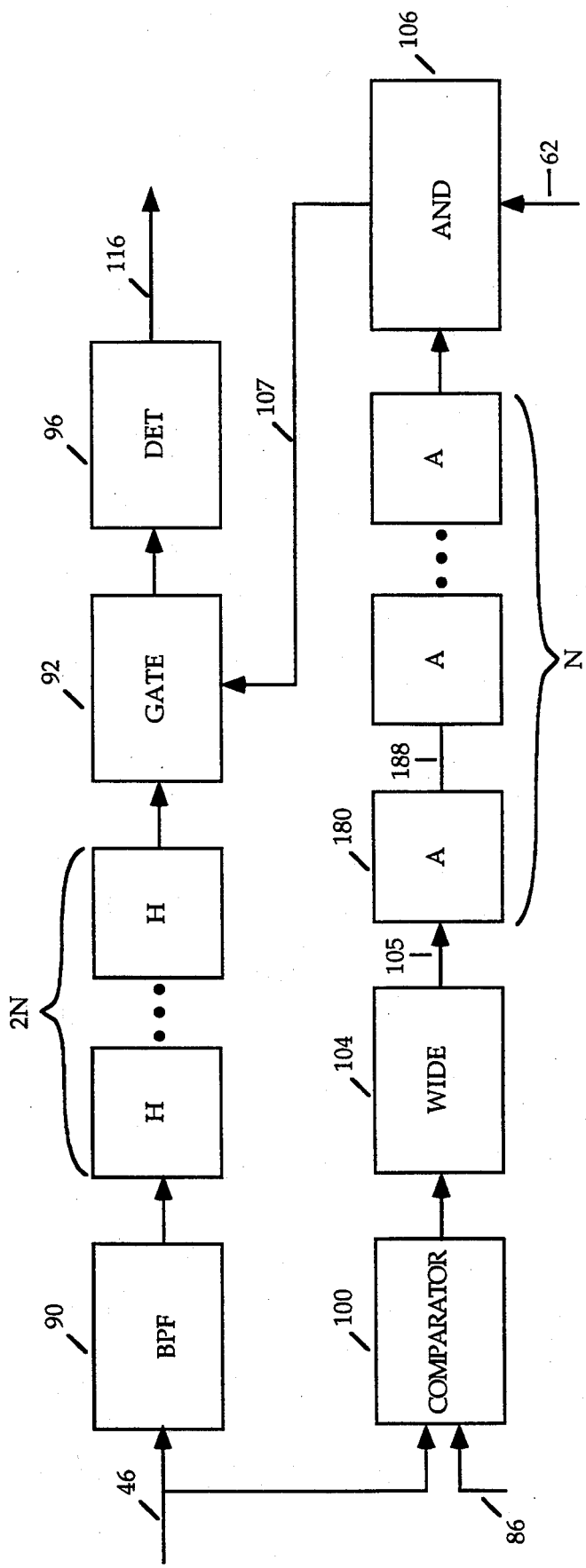
FIGS. 13a-13c illustrate a method and apparatus for eliminating the highly bright objects from the evaluation function for an alternative embodiment.
Figure 13B:
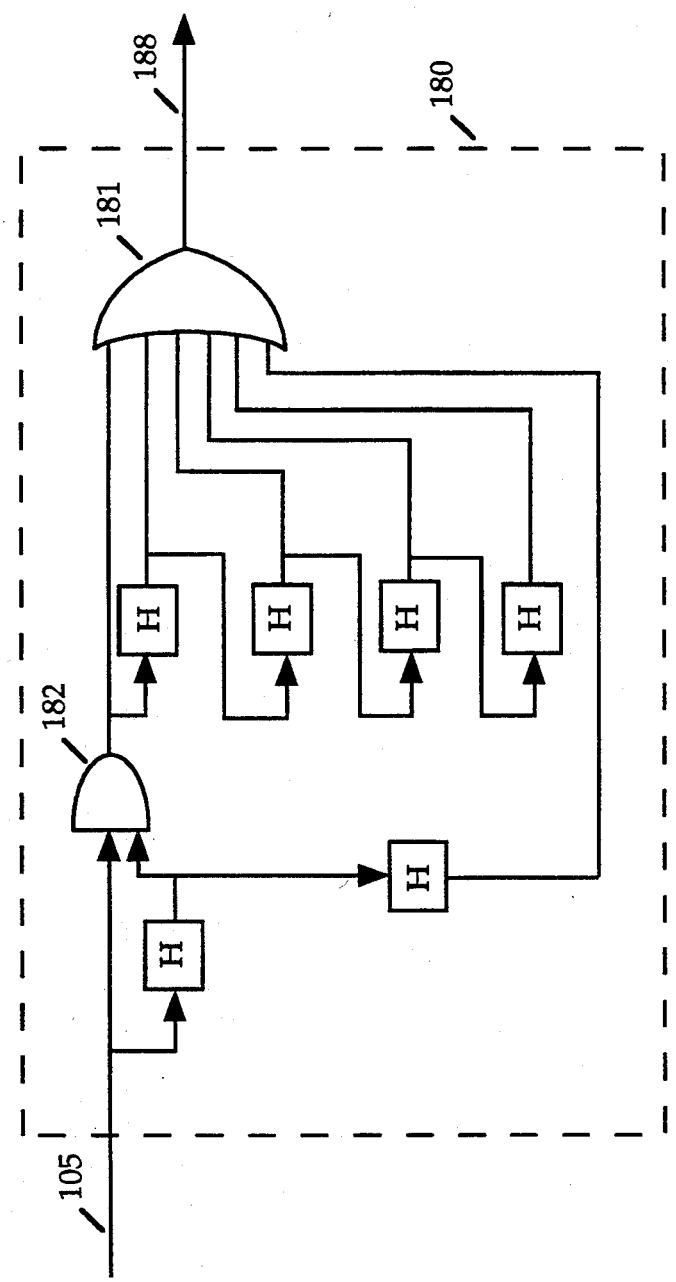
Figure 13C:
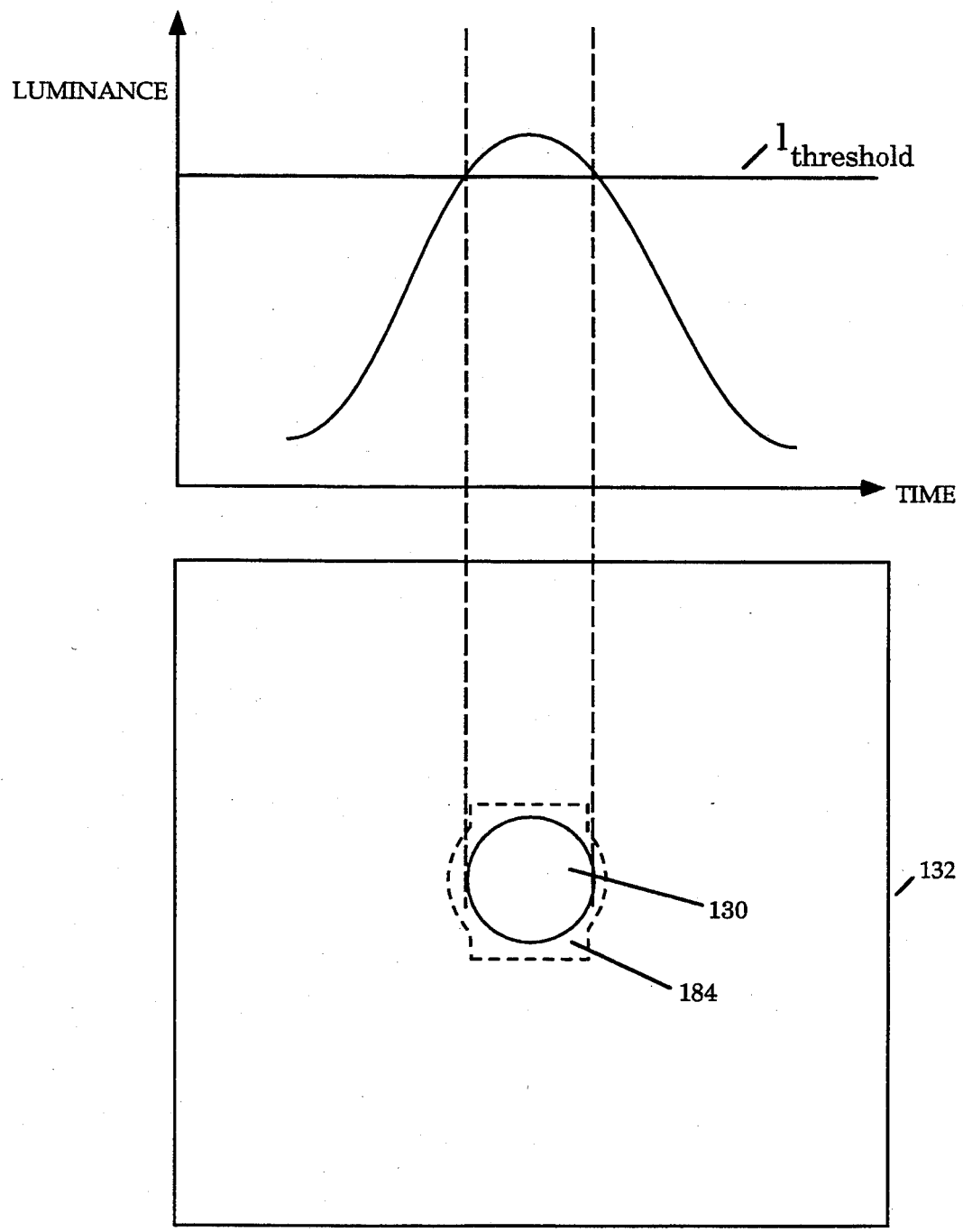

FIGS. 13a–13c illustrate a method and apparatus for eliminating the highly bright objects from the evaluation function for an alternative embodiment. FIG. 13a is a block diagram of a circuit for eliminating the area 134 of the highly bright object 130 from the evaluation function 116. A series of 2N delay elements labeled "H" are coupled to receive and delay the output of the BPF 90. A series of N adjacent line delay wide circuits, such as the adjacent line delay circuit 180, are coupled to received the wide pulse 105 from the WIDE circuit 104.

FIG. 13b illustrates the adjacent line delay circuit 180, which is comprised of an OR gate 181, an AND gate 182, and a set of delay elements labeled "H". The adjacent line delay circuit 180 is coupled to receive the wide pulse 105. The wide pulse 105 is gated and delayed as shown to generate an adjacent line delay pulse 188. Each of the adjacent line delay circuits eliminates part of an adjacent line. The set of adjacent line delay circuits shown in FIG. 13a eliminates N adjacent lines from the evaluation function 116. FIG. 13c shows an area 184 of the evaluation window 132 eliminated from the evaluation function 116 for the alternative embodiment.

Figure 14:
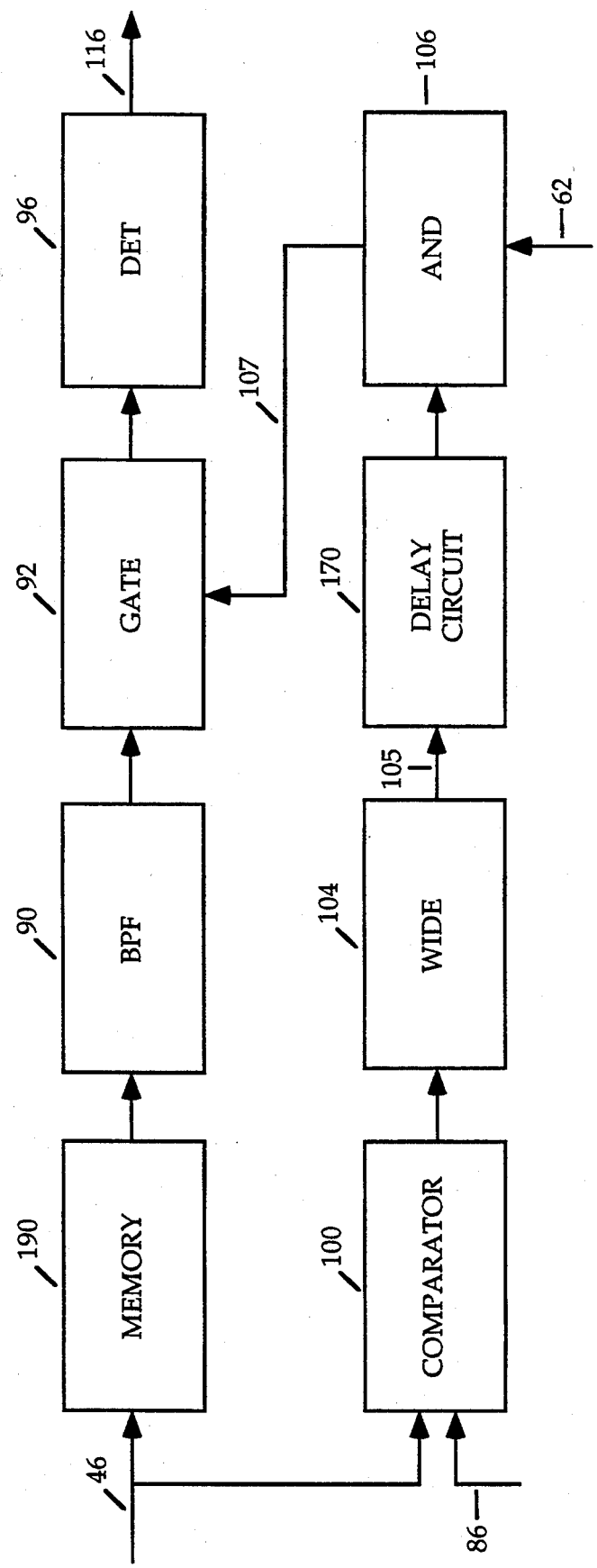
FIG. 14 illustrates another alternative embodiment for eliminating highly bright objects from the evaluation function, wherein the luminance signal is stored in a memory circuit.

FIG. 14 illustrates another alternative embodiment for eliminating highly bright objects from the evaluation function, wherein the luminance signal 46 is stored in a memory circuit 190. The memory circuit 190 is coupled to receive the luminance signal 46 from the CCD array 32. The memory circuit 190 stores the luminance signal 46 for subsequent transfer to the BPF 90. The luminance signal 46 is delayed while being transferred from the memory circuit 190 to the BPF 90. Also, the delay wide circuit 170 is coupled to received the wide pulse 105 from the WIDE circuit 104.

Figure 15:
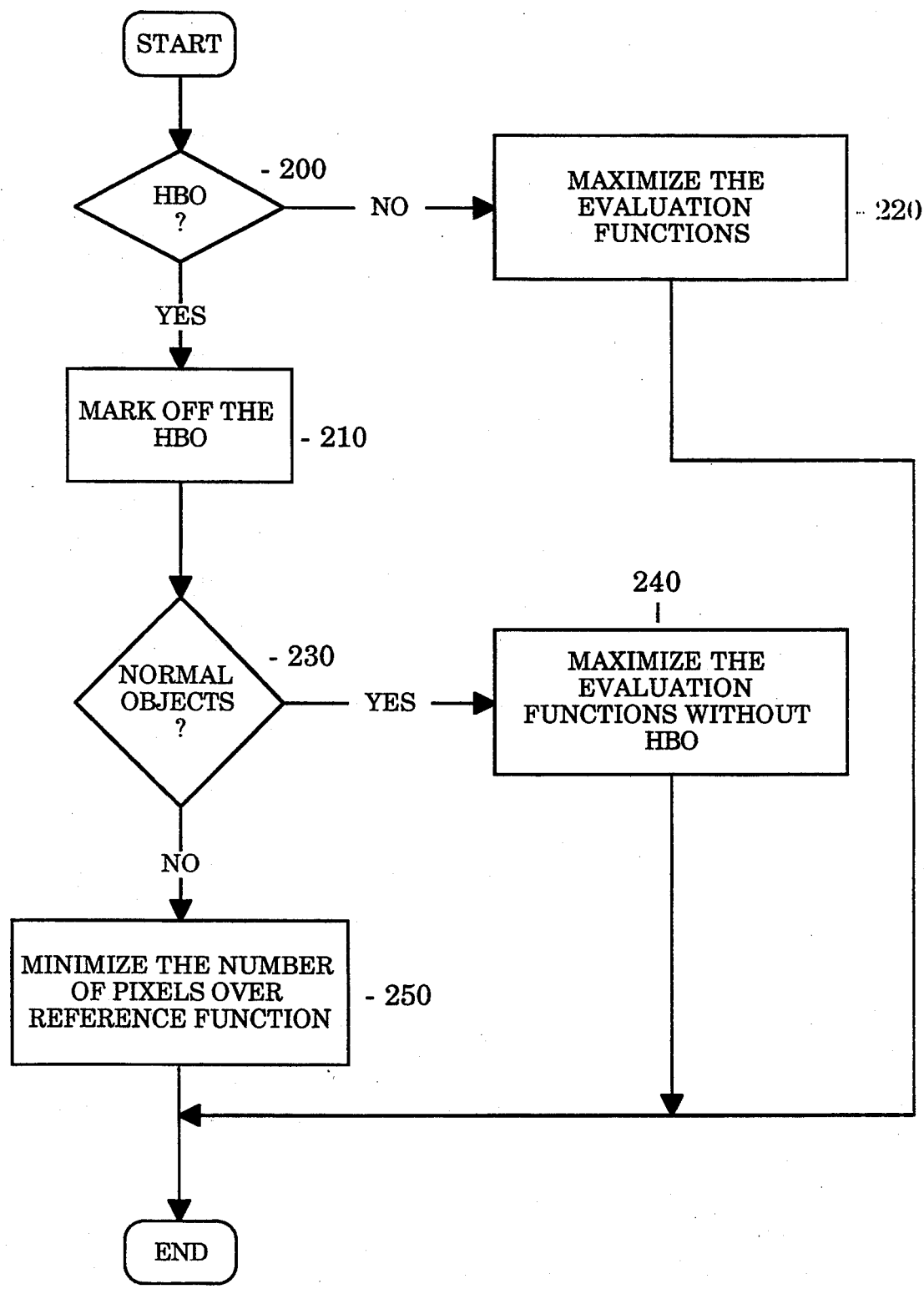
FIG. 15 is a flow diagram illustrating a method for automatically focusing a video camera wherein the image scene may contain highly bright objects.

FIG. 15 is a flow diagram illustrating a method for automatically focusing video cameras wherein the image scene may contain highly bright objects. At decision block 200, the image scene is tested for highly bright objects. If no highly bright objects are detected, then control proceeds to block 220. At block 220, the AF microcomputer 38 adjusts the optical lens system 30 to maximize the evaluation function since the image scene contains normal objects only.

If highly bright objects are detected at decision block 200, then control proceeds to block 210. At block 210, the highly bright objects are masked off from the luminance signal in order to detect normal objects in the image scene. At decision block 230, the image scene is tested for normal objects. If no normal objects are detected, then control proceeds to block 250. At block 250, the AF microcomputer 38 adjusts the optical lens system 30 to minimize the number of the pixels over reference function since the image scene contains only highly bright objects.

If normal objects are detected at decision block 230, then control proceeds to block 240. At block 240, the AF microcomputer 38 adjusts the optical lens system 30 to maximize the evaluation function since highly bright objects are masked from the luminance signal.

Figure 16:
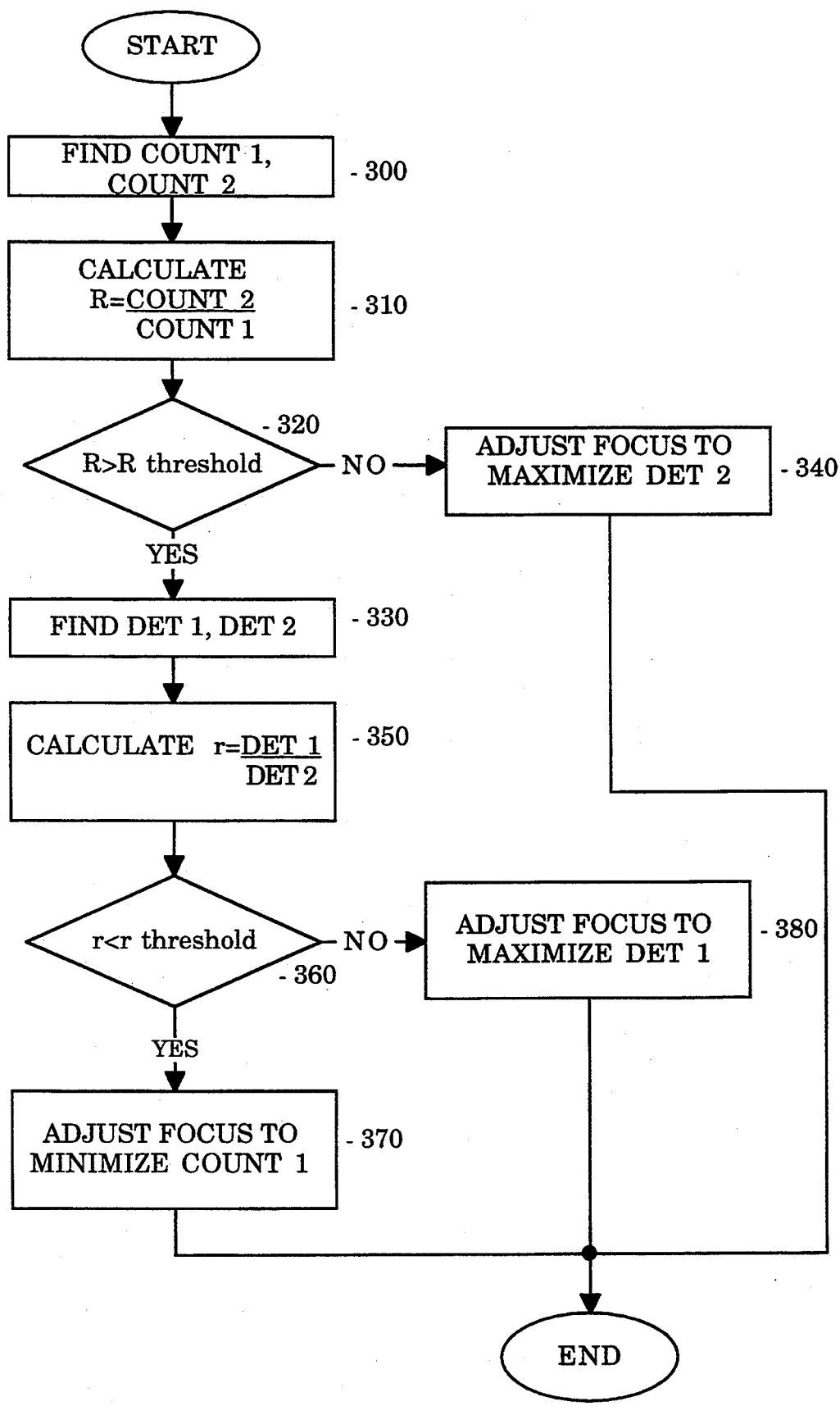
FIG. 16 is a flow diagram for one embodiment of the present method and apparatus for automatically focusing a video camera, wherein the image scene may contain highly bright objects.

FIG. 16 is a flow diagram for one embodiment of the present method and apparatus for automatically focusing video cameras, wherein the image scene may contain highly bright objects. At block 300, the AF microcomputer 38 sets the reference signals 86 and 88 to generate the count signal 120 (COUNT1) and the count signal 122 (COUNT2). At block 310, the AF microcomputer 38 calculates the ratio R, which equals COUNT2 divided by COUNT1 for the current focus position of the optical lens system 30.

At decision block 320, the AF microcomputer 38 determines $R_{threshold}$ in the manner previously discussed, and compares the ratio R to $R_{threshold}$. If the ratio R is not greater than $R_{threshold}$, then control proceeds to block 340 since the evaluation window of the image scene does not contain highly bright objects. At block 340, the AF microcomputer 38 adjusts the focus of the lens system 30 to maximize the evaluation function 118 (DET2).

At decision block 320, if the ratio R is greater than $R_{threshold}$, then control proceeds to block 330 since the evaluation window of the image scene contains highly bright objects. At block 330, the AF microcomputer 38 sets the reference signal 86 to generate the evaluation function 116 (DET1) and the evaluation function 118 (DET2). As discussed previously, the evaluation function DET1 is generated without contribution from the highly bright objects, and the evaluation function DET2 is generated with the contribution of the highly bright objects.

At block 350, the AF microcomputer 38 calculates the ratio r, which equals DET1 divided by DET2 for the current focus position of the optical lens system 30. At decision block 360, the AF microcomputer 38 compares the ratio r to $r_{threshold}$. If the ratio r is not less than $r_{threshold}$, then control proceeds to block 380 since the evaluation window of the image scene contains normal objects. At block 380, the AF microcomputer 38 adjusts the focus of the lens system 30 to maximize the evaluation function 116 (DET1).

At decision block 360, if the ratio r is less than $r_{threshold}$, then control proceeds to block 370 since the evaluation window of the image scene does not contain normal objects. At block 370, the AF microcomputer 38 adjusts the focus of the lens system 30 to minimize the count signal COUNT1 in order to focus on the highly bright objects.

In the foregoing specification, the invention has been described with reference to specific exemplary embodiments thereof. It will, however, be evident that various modifications and changes may be made thereto without departing from the broader spirit and scope of the invention as set forth in the independent claims. The specification and drawings are accordingly to be regarded as an illustrative, rather than in a restrictive sense.

What is claimed is:

1. A method for automatically adjusting the focus of a camera on an image frame, comprising the steps of:
   (a) scanning an image frame;
   (b) searching for at least one highly bright object in said image frame, said searching step comprising:
   (1) generating a first count signal by comparing a first reference signal to a luminance signal corresponding to said image frame;
   (2) generating a second count signal by comparing a second reference signal to said luminance signal, such that said second reference signal is greater in intensity than said first reference signal;
   (3) determining a ratio of said second count signal to said first count signal, such that, if the ratio of the second count signal to the first count signal is greater than a first threshold, then a highly bright object is detected;

(c) searching the image frame for at least one normal object and adjusting the focus of said camera on said at least one normal object when a highly bright object is not detected;
(d) adjusting the focus of said camera when a highly bright object is detected in accordance With the steps of:
  (1) searching for at least one normal object; and
  (2) adjusting the focus of said camera while masking off said highly bright object if said at least one normal object is detected, said masking off step comprising the steps of:
comparing said first reference signal to said luminance signal corresponding to said image frame;
generating a comparator pulse signal if said luminance signal intensity is greater than said reference signal. intensity, such that said comparator pulse signal overlaps a portion of said luminance signal corresponding to said highly bright object;
generating a first evaluation function by masking said highly bright object from said luminance signal with said comparator pulse signal;
(e) adjusting the focus of said camera when a highly bright object is detected and a normal object is not detected by not masking off said highly bright object from said image frame such that said first count signal is at or close to a relative minimum value.

2. The method of claim 1 wherein said step of searching an image frame for at least one normal object comprises the steps of:
(a) generating a second evaluation function which includes said highly bright object;
(b) determining a ratio of said first evaluation function to said second evaluation function;
(c) if said ratio of said first evaluation function to said second evaluation function is less than a threshold ratio, then said normal object is not detected;
(d) if said ratio of said first evaluation function to said second evaluation function is greater than or equal to said threshold ratio, then said normal object is detected.

3. An apparatus for automatically adjusting the focus of a camera, comprising:
(a) means for scanning an image frame;
(b) means for searching for at least one highly bright object in said image frame, said detection means for searching further comprising:
  (1) means for generating a first count signal by comparing a first reference signal to a luminance signal corresponding to said image frame;
  (2) means for generating a second count signal by comparing a second reference signal to said luminance signal, such that said second reference signal has a greater intensity than said first reference signal;
  (3) means for determining a ratio of said second count signal to said first count signal, such that, if the ratio of the second count signal to the first count signal is greater than a first threshold, then a highly bright object is detected;
(c) means for searching said image frame for at least one normal object and means for adjusting the focus of said camera on said at least one normal object when a highly bright object is not detected;
(d) means for adjusting the focus of said camera when a highly bright object is detected including:
  (1) means for searching for at least one normal object;
  (2) means for adjusting the focus of said camera while masking off said highly bright object if said at least one normal object is detected, said masking off accomplished using masking means, comprising:
means for comparing a reference signal to said luminance signal corresponding to said image frame;
means for generating a comparator pulse signal if said luminance signal is greater than said reference signal, such that said comparator pulse signal overlaps a portion of said luminance signal corresponding to said highly bright object;
means for generating a first evaluation function by masking said highly bright object from said luminance signal with said comparator pulse signal;
  (3) means for adjusting the focus of said camera while not masking off said highly bright object from said image frame, such that said first count signal is at or close to a relative minimum value, if said at least one normal object is not detected.

4. The apparatus of claim 3 further comprising means for searching said image frame for at least one normal object and means for adjusting the focus of said camera on said at least one normal object when a highly bright object is not detected.

5. The apparatus of claim 3, wherein said means for scanning an image frame for at least one normal object comprises:
(a) means for generating a second evaluation function which includes said highly bright object;
(b) means for determining a ratio of said first evaluation function to said second evaluation function;
whereby if said ratio of said first evaluation function to said second evaluation function is less than a threshold ratio, then said normal object is not detected, or if said ratio of said first evaluation function to said second evaluation function is greater than or equal to said threshold ratio, then said normal object is detected.

* * * * *